(12) United States Patent  (10) Patent No.: US 9,110,703 B2
Santos et al.  (45) Date of Patent: Aug. 18, 2015

(54) VIRTUAL MACHINE PACKET PROCESSING

(75) Inventors: Jose Renato G. Santos, San Jose, CA (US); Yoshio Turner, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 13/155,165

(22) Filed: Jun. 7, 2011

(65) Prior Publication Data

US 2012/0317566 A1  Dec. 13, 2012

(51) Int. Cl.
  *H04L 12/28*  (2006.01)
  *G06F 9/455*  (2006.01)
  *H04L 12/747*  (2013.01)

(52) U.S. Cl.
  CPC .......... *G06F 9/45558* (2013.01); *H04L 45/742* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 6,341,130 B1 * | 1/2002 | Lakshman et al. | 370/389 |
| 6,691,168 B1 * | 2/2004 | Bal et al. | 709/238 |
| 7,227,842 B1 * | 6/2007 | Ji et al. | 370/235 |
| 7,519,070 B2 * | 4/2009 | Van Lunteren | 370/397 |
| 7,873,833 B2 * | 1/2011 | Singh et al. | 713/176 |
| 8,054,832 B1 * | 11/2011 | Shukla et al. | 370/389 |
| 2002/0116706 A1 * | 8/2002 | Bahraini | 725/32 |
| 2002/0191605 A1 * | 12/2002 | Lunteren et al. | 370/389 |
| 2003/0156586 A1 * | 8/2003 | Lee et al. | 370/392 |
| 2004/0022259 A1 * | 2/2004 | Tuchow | 370/401 |
| 2004/0081180 A1 * | 4/2004 | De Silva et al. | 370/402 |
| 2004/0264373 A1 * | 12/2004 | Engbersen et al. | 370/230 |
| 2005/0083935 A1 * | 4/2005 | Kounavis et al. | 370/392 |
| 2005/0213582 A1 * | 9/2005 | Wakumoto et al. | 370/395.3 |
| 2005/0254502 A1 * | 11/2005 | Choi | 370/395.32 |
| 2006/0221956 A1 * | 10/2006 | Narayan et al. | 370/389 |
| 2008/0086725 A1 * | 4/2008 | Boss et al. | 718/1 |
| 2008/0120487 A1 * | 5/2008 | Saripalli | 711/206 |
| 2008/0186971 A1 * | 8/2008 | Carmichael et al. | 370/392 |
| 2008/0267081 A1 * | 10/2008 | Roeck | 370/249 |
| 2009/0141716 A1 * | 6/2009 | Chang | 370/389 |
| 2010/0107162 A1 * | 4/2010 | Edwards et al. | 718/1 |
| 2010/0118868 A1 * | 5/2010 | Dabagh et al. | 370/389 |
| 2010/0118871 A1 * | 5/2010 | Liu et al. | 370/389 |
| 2010/0199275 A1 * | 8/2010 | Mudigonda et al. | 718/1 |
| 2010/0223397 A1 * | 9/2010 | Elzur | 709/235 |
| 2010/0232443 A1 * | 9/2010 | Pandey | 370/401 |
| 2011/0019679 A1 * | 1/2011 | Akahane et al. | 370/401 |

(Continued)

OTHER PUBLICATIONS

Cisco VN-Link: Virtualization-Aware Networking. CISCO. < http://www.cisco.com/en/US/solutions/collateral/ns340/ ns517/ns224/ns892/ns894/white_paper_c11-525307_ps9902_Products_White_Paper.html >, 2009.

*Primary Examiner* — Marsha D Banks Harold
*Assistant Examiner* — Christopher Wyllie
(74) *Attorney, Agent, or Firm* — Mannava & Kang, P.C.

(57) ABSTRACT

Packet processing for packets from a virtual machine includes receiving a packet from an external switch at a computer system hosting a plurality of virtual machines. If the received packet is a learning packet, storing a packet signature determined from the learning packet. For a packet to be transmitted from a virtual machine in the computer system, determining if the packet's signature matches the stored packet signature. If the packet's signature matches the stored packet signature, performing an action associated with the packet signature.

13 Claims, 6 Drawing Sheets

(56) References Cited

U.S. PATENT DOCUMENTS

| | | |
|---|---|---|
| 2011/0038375 A1* | 2/2011 | Liu et al. .................... 370/392 |
| 2011/0103389 A1* | 5/2011 | Kidambi et al. .......... 370/395.1 |
| 2011/0299537 A1* | 12/2011 | Saraiya et al. ............. 370/392 |
| 2011/0320632 A1* | 12/2011 | Karino ........................ 709/238 |
| 2012/0016970 A1* | 1/2012 | Shah et al. .................. 709/220 |
| 2012/0106354 A1* | 5/2012 | Pleshek et al. .............. 370/241 |
| 2012/0291025 A1* | 11/2012 | Kidambi et al. ............... 718/1 |

* cited by examiner

VIRTUAL MACHINE PACKET PROCESSING

BACKGROUND

Virtual machine (VM) environments may provide network connectivity to VMs using a virtual Ethernet bridge (VEB), which can be implemented in software or in hardware. VEBs are located at the computer system hosting the VMs. VEBs provide basic capabilities to forward network packets between VMs located on the same host (i.e., co-located VMs) as well as between local VMs and external network devices. However, typical VEBs are more limited and lack some of the features of traditional Ethernet switches such as support for packet filtering and Access Control Lists (ACLs).

To overcome these limitations the industry has proposed solutions where packets are always sent to an external switch, even if the destination VM machine is on the same host server as the source VM. Virtual Ethernet Port Aggregator (VEPA) is an industry standard in development that has been proposed to IEEE. VEPA is currently being considered by the IEEE 802.1Qbg working group. VEPA proposes use of an external switch to forward traffic between co-located VMs. In particular, VEPA sends all traffic from a host server, including the traffic between co-located VMs on the host server, on an external network link to an external switch. Thus, traffic between co-located VMs is sent to the external switch and then back again to the server on the same link.

The VEPA approach allows the management of VM network traffic in the same way as traffic between traditional servers, and allows the use of sophisticated packet filtering and ACL processing capabilities available on standard Ethernet switches. However, packets between co-located VMs wastes link bandwidth between the server and the external switch in both directions.

BRIEF DESCRIPTION OF DRAWINGS

The embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

According to an embodiment, packet signatures for packets that are accepted by an external switch, which may be operating according to the proposed VEPA standard, are stored at a host, which may be a computer system hosting VMs. A packet signature may be a set of values for one or more fields of a packet. The set of packet signatures stored in the host operate as a cache representative of packet filtering processing performed in the external switch. For packets that are sent from one VM to another VM in the same host, information in the cache may be used to determine whether to forward the packets directly to the destination. This way, for co-located VMs, most packets for which a signature is found in the cache can be forwarded directly to the destination co-located VM without sending the packets to the external switch. Accordingly, packet processing results from the external switch are leveraged, and bandwidth is conserved by reducing traffic sent on an external link when using VEPA.

Figure 1:
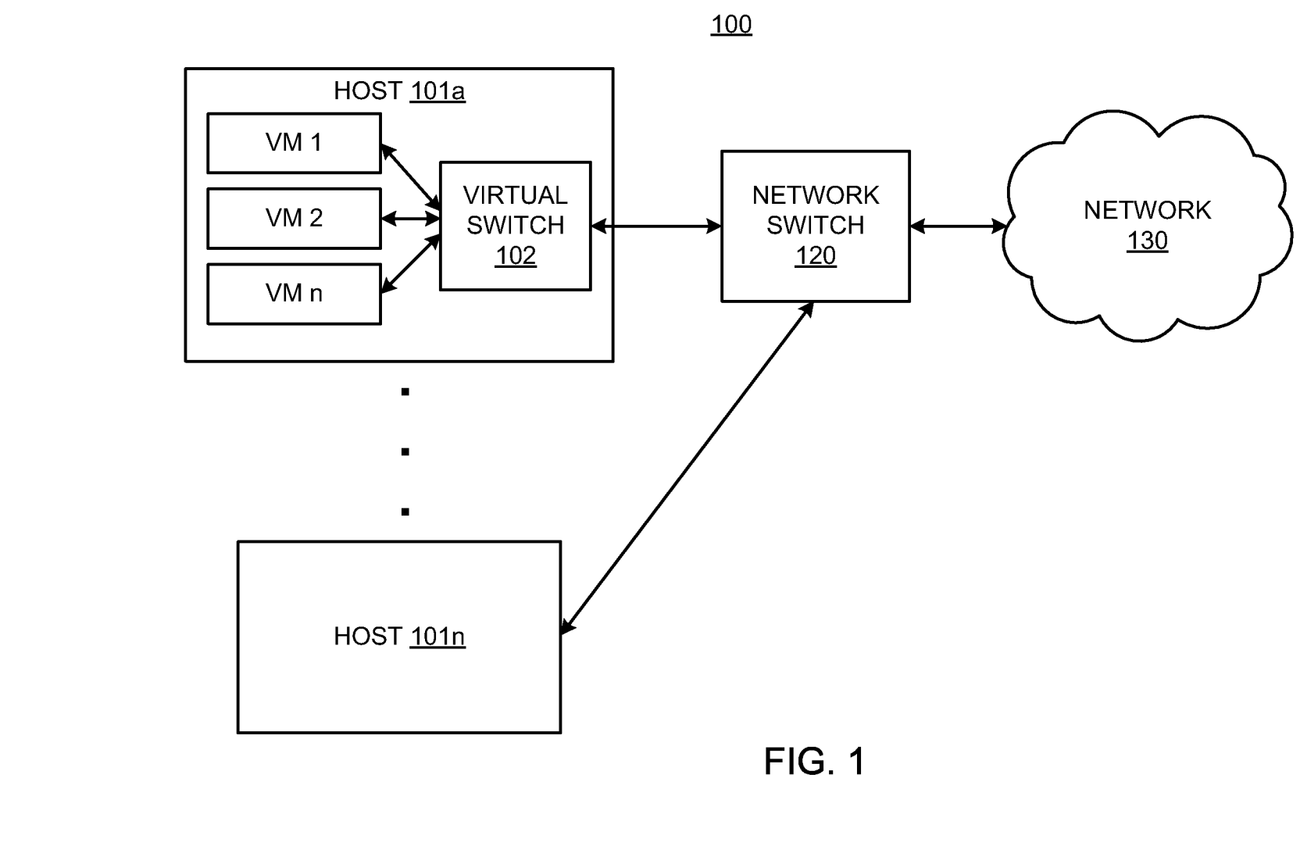
FIG. 1 illustrates a system, according to an embodiment.

FIG. 1 illustrates a system 100, according to an embodiment. The system 100 includes hosts 101a-n and a network switch 120 connecting the hosts 101a-n to a network 130. The hosts 101a-n may run virtualization software to provide a virtualization environment for creating and managing VMs. A VM is a software implementation of a machine (i.e. a computer) that executes programs like a physical machine. The host 101a is shown as hosting VMs 1-n but other hosts may host the VMs. VMs provided on the same host are referred to as co-located. Although not shown, the system 100 may include multiple network switches connected to multiple networks. The network switches may include L2 or L3 switches or other network devices managing network traffic. Also, the hosts may each include the components of the host 101a. The hosts 101a-n are computer systems and may be servers. The hosts 101a-n and network switch 120 may be provided in a data center and may be part of a cloud system. Also, each of the hosts and network switches include conventional components not shown.

The host 101a includes a virtual switch 102. The virtual switch 102 forwards network traffic to and from the VMs 1-n. Each of the VMs 1-n may include a MAC and/or IP address and the virtual switch 102 forwards network traffic using the addresses.

The virtual switch 102 may be a VEB to provide local bridging between multiple VMs and connectivity to the external network environment. VEBs expand the capabilities of hypervisors to include limited traffic controls. In one embodiment, the virtual switch 102 is part of virtualization software. Virtual machine environments, such as provided by VMWARE, XEN, and KVM, provide a software-based virtual switch to forward packets to and from VMs. In another embodiment, the virtual switch 102 is included in a network interface controller (NIC), also known as a network interface card, for the host 101a. The NIC is not shown, but it provides the host 101a with connectivity to the network switch 120 and network 130. Modern NICs provide an embedded hardware Ethernet bridge operating as the virtual switch to forward traffic between VMs and traffic external to the host. Conventional hardware and software virtual switches to do not provide the functionality described according to the embodiments herein.

The virtual switch 102 may have limited resources, however, the network switch 120 includes the hardware and software resources to perform full packet filtering and access control list (ACL) processing capabilities. Packet filtering may include programmable network functions which may be implemented at the network switch 120 to perform appropriate packet processing actions depending on the type of packet. Packet filtering is based on a rule table that contains a set of rules defining actions that should be applied to packets. The rule table is further described with respect to FIG. 3. Each rule in the table contains two parts, a pattern matching specification and a set of actions. The pattern matching specification defines values for a set of packet fields that are used to select packets that match the rule. Fields that may be used in pattern matching include source and destination MAC addresses, source and destination IP addresses, source and destination Transmission Control Protocol (TCP)/User Datagram Protocol (UDP) ports, type of packet, VLAN, switch port where the packet was received, etc. A pattern matching specification can define exact values or wildcard values, which match any value, to each of the fields defined by the rule table. For example to match all packets sent by a given server, a rule can be defined with pattern matching specifying the server IP address as an exact value and specifying all other fields as wildcards. Each rule can specify one or more actions that should be performed for a packet that matches the rule. Typical actions include "deny", which causes the packet to be dropped, and "accepted" which allow the packet to be forwarded normally to its destination. Other actions such as duplicate the packet in another port (used to do traffic monitoring for example), or modify a packet field (such as change the VLAN id for example, or change the destination address for packet interception are also possible). A packet can match multiple rules. If multiple rules match a packet, the rule with highest priority may be selected to be implemented. If two packets have the same signature, they match the same rule in the rule table and thus are subject to the same set of actions.

According to the proposed VEPA standard, all packets between co-located VMs in the hosts 101a-n are sent to the network switch 120 so packet filtering can be performed on the packets. According to an embodiment, the virtual switch 102 forwards packet directly between co-located VMs in the host 101a without sending the packets outside the host 101a based on packet processing actions learned from the network switch 120, as is described in further detail below.

Figure 2:
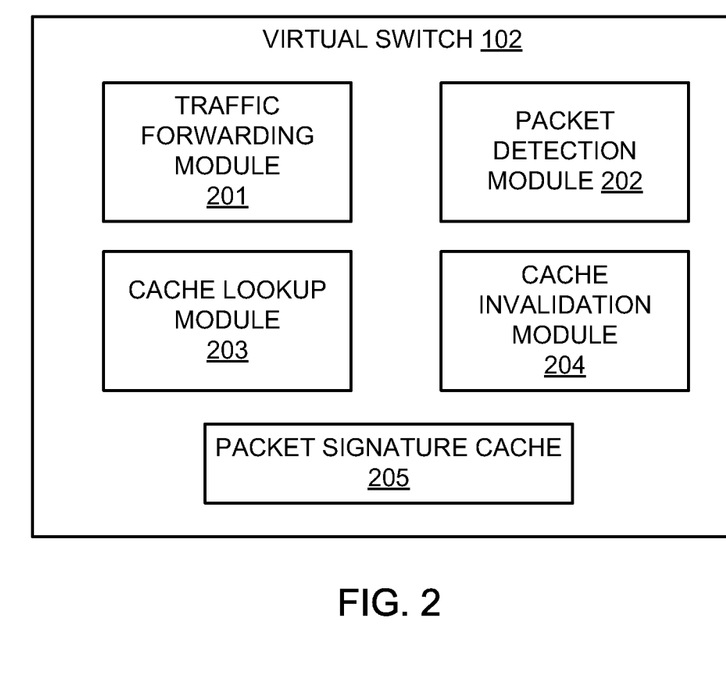
FIG. 2 illustrates modules in a virtual switch, according to an embodiment.

FIG. 2 shows modules in the virtual switch 102. Modules may be implemented in hardware and/or as machine readable instructions executed by hardware, such as a processor or other processing circuit. The virtual switch 102 includes a traffic forwarding module 201, a cache lookup module 203, a packet detection module 202, a cache invalidation module 204, and a packet signature cache 205. The traffic forwarding module 201 forwards traffic directly between co-located VMs or forwards traffic external to the host 101a, such as to the network switch 120 or other network devices.

The packet detection module 202 inspects packets received from an external link, which includes packets from the network switch 120 which is connected by an external link to the host 101a as shown in FIG. 1. The packet detection module 202 detects learning packets received from the external link. A learning packet is a packet marked by the network switch 120 as a packet cacheable in the host 101a. For example, the learning packet is a regular packet with a header bit set indicating that the host 101a can forward future packets with the same signature without participation of the network switch 120. Instead of a header bit, other types of identifiers may be used to identify a learning packet. If a received packet is a learning packet, its signature is added to the packet signature cache 205 if not already stored in the packet signature cache 205. Through this process multiple packet signatures are stored in the packet signature cache 205.

The cache lookup module 203 determines whether packets to be forwarded by the virtual switch 102 have a signature matching any signatures in the packet signature cache 205. For example, a packet is generated by VM 1 shown in FIG. 1. The signature for the packet is determined and compared to the signatures in the packet signature cache 205. If there is a match, the packet is directed to the traffic forwarding module 201 to be delivered directly to the destination VM using the normal forwarding process (i.e., the virtual switch 102 operates in non-VEPA mode for the packet). If a match is not found, the packet is directed to the traffic forwarding module 201 to be sent to the external link to be processed by the network switch 120 (i.e., the virtual switch 102 operates in regular VEPA mode for that packet).

The cache invalidation module 204 receives cache invalidation messages from the network switch 120 and invalidates one or more signatures in the packet signature cache 205 responsive to a cache invalidation message. A cache invalidation message is a message that indicates one or more signatures stored in the packet signature cache 205 are no longer representative of an "accept" packet processing action that allows packets to be directly forwarded between co-located VMs. For example, a traffic rule and action may be modified by a network administrator or a system. The modified traffic rule and action are stored in the network switch 120, so the network switch 120 can enforce the modification. In one embodiment, the network switch 120 determines whether the modification is for an action corresponding to packet signature stored in the packet signature cache 205. If so, the network switch 120 sends a cache invalidation message to the virtual switch 102. The cache invalidation module 204 identifies the message and deletes one or more corresponding packet signatures from the packet signature cache 205. One example of a modified traffic rule that may invoke the cache invalidation message includes a traffic rule that originally included sending all packets received from VM 1 and having a destination of VM 2 only to the co-located VM 2. The modified rule now specifies that packets from VM 1 destined for VM 2 must also be mirrored to another port and also sent to another destination. In this example, the network switch 120 cannot be bypassed, because the network switch 120 need to send the packets to an addition destination. Thus, the cache invalidation message is sent to the virtual switch 102 from the network switch 120.

In one embodiment, the cache invalidation module 204 deletes all the signatures in the packet signature cache 205 if a cache invalidation message is received. The cache invalidation module 204 may then send an invalidation confirmation message notifying the network switch 120 that the cache invalidation process was completed. In another embodiment, the cache invalidation message identifies one or more specific signatures to delete from the packet signature cache 205. The cache invalidation module 204 deletes the identified signatures from the packet signature cache 205 and the other packet signatures not identified in the cache invalidation message remain in the packet signature cache 205. The cache invalidation module 204 may then send an invalidation confirmation message notifying the network switch 120 that the cache invalidation process was completed.

Figure 3:
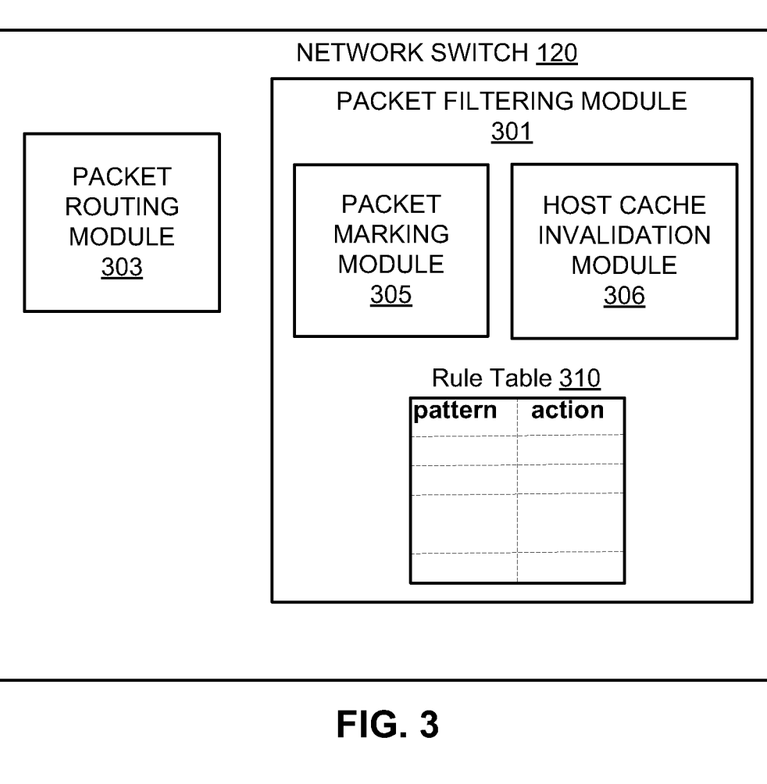
FIG. 3 illustrates modules in a network switch, according to an embodiment.

FIG. 3 shows the network switch 120. The network switch 120 includes a packet filtering module 301 performing packet filtering processes according to traffic rules and their corresponding actions. The rules and actions are stored in a rule table 310. The rule table 310, for example, stores patterns and one or more corresponding actions for each pattern. The patterns may be packet signatures. If a packet is received and is determined to have a packet signature matching a pattern in the rule table 310, the corresponding action is performed for the packet.

The packet marking module 305 determines whether the action to be applied to a packet after processing the packet using the rule table 310 is an action that can be cached at the virtual switch 102. For example, the action can be cached at the virtual switch 102 if it is an "accept" action and no other action is to be applied to the packet. An "accept" action is that a packet is approved to be forwarded to its destination, such as to a co-located VM or to a destination external to the host 101a. If the action can be cached, the packet marking module 305 sends a learning packet to the virtual switch 102, which may include setting a bit in the original packet and forwarding it as usual to the virtual switch 102.

The network switch 120 includes a host cache invalidation module 306 that generates a cache invalidation message responsive to modification of a rule in the rule table 310. The cache invalidation message may be a packet with a bit set to a predetermined value to indicate it is a cache invalidation message. In one embodiment, the host cache invalidation module 306 sends a cache invalidation message to the virtual switch 102 if any rule is modified in the rule table 310. In another embodiment, the cache invalidation message identifies the specific signature to remove from the packet signature cache 205 in the virtual switch 102. The host cache invalidation module 306 may also determine if an invalidation acknowledgement packet is received from the virtual switch within a timeout period responsive to sending the cache invalidation message. If the invalidation acknowledgement packet is not received from the virtual switch 102 within the timeout, the cache invalidation message is re-sent. If the invalidation acknowledgement packet is received from the virtual switch 102 within the timeout, the host cache invalidation module 306 marks the action modification as complete in the rule table 310. The network switch 120 also includes packet module 303, which forwards packets to their destinations.

Figure 4:
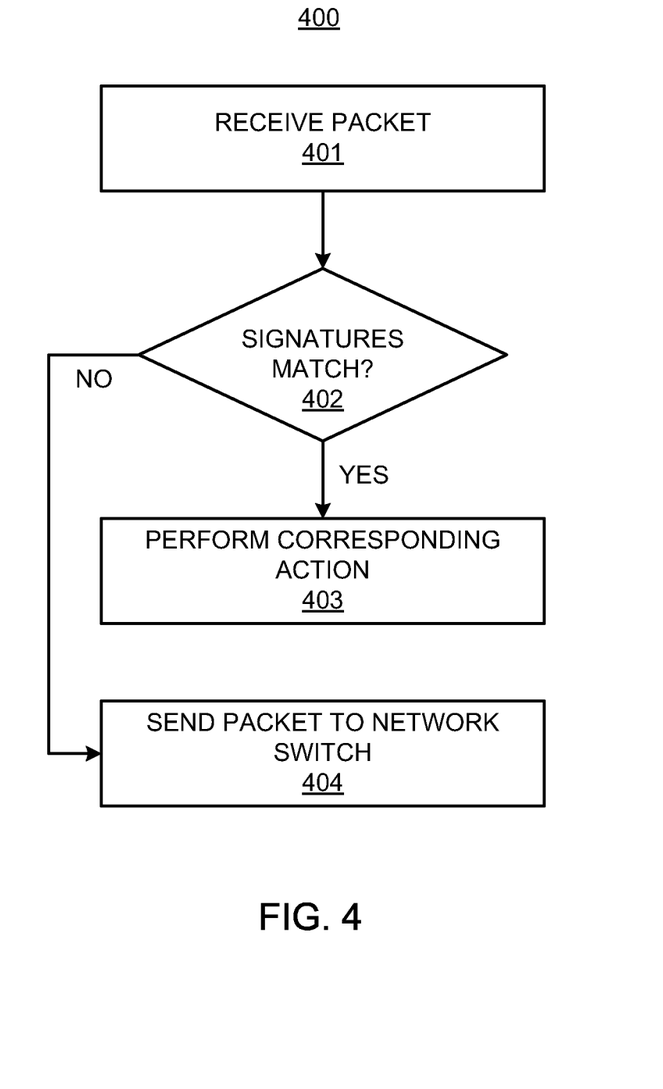
FIG. 4 illustrates a method for performing packet forwarding actions at a virtual switch, according to an embodiment.

FIG. 4 illustrates a method 400, according to an embodiment for forwarding traffic. The method 400 is described by way of example and not limitation as being performed by the virtual switch 102 shown in FIGS. 1 and 2.

At block 401, the virtual switch 102 receives a packet. The packet may be a packet generated by one of the VMs, such as VM 1.

At block 402, the cache lookup module 203 determines if the packet's signature matches a signature of a packet stored in the packet signature cache 205. The cache lookup module 203 may determine the packet signature from values in one or more header fields in the packet. A predetermined hash table or another type of predetermined lookup function may be used to locate the packet signature in the cache. The packet signature is then compared to the packet signatures in the packet signature cache 205 to identify any match.

At block 403, if there is a match, the packet is transferred to the traffic forwarding module 201 that forwards the packet. Packet forwarding can be done for example using a learned forwarding table mapping destination MAC addresses to ports. The packet is forwarded directly to a co-located VM if it is a local packet or is sent to an external network switch if it is destined to an external host.

If no match is found at block 402, then at block 404, the packet is sent from the virtual switch 102 to the network switch 120, regardless if it is destined to a co-located VM or to an external host. The packet forwarding to an external switch may be in accordance with the proposed VEPA standard.

Figure 5:
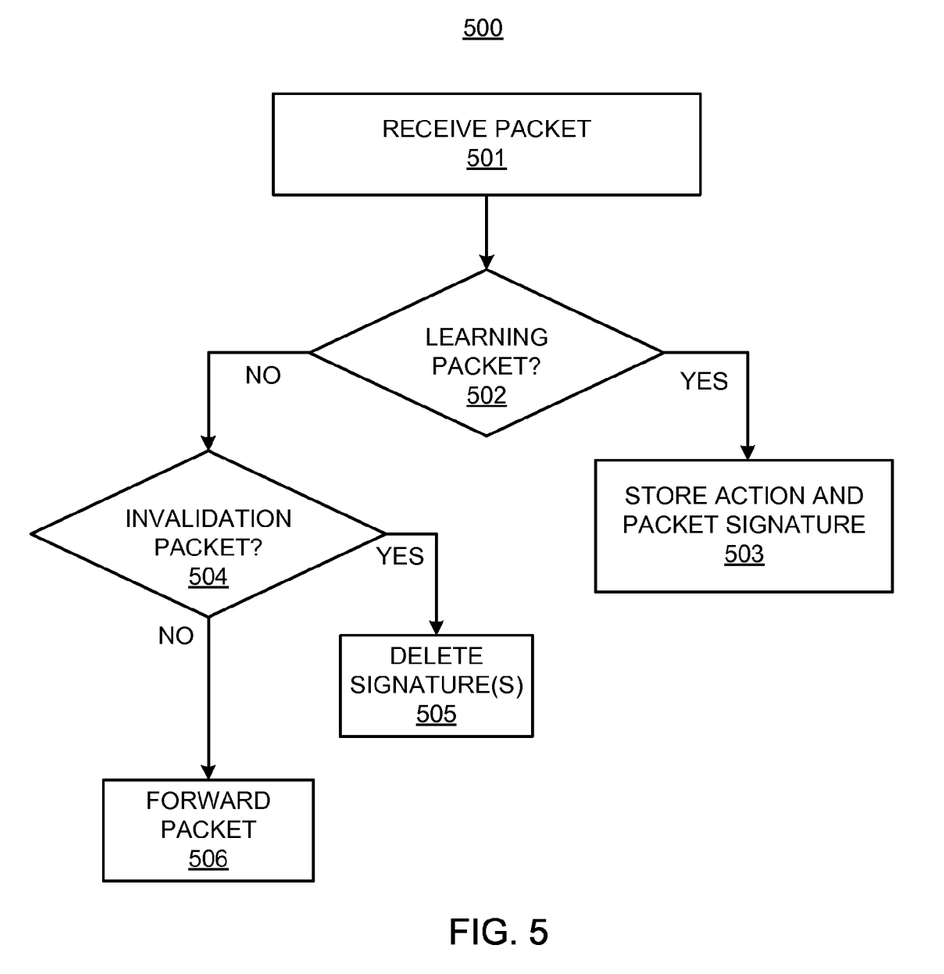
FIG. 5 illustrates a method for identifying packet processing actions, according to an embodiment.

FIG. 5 illustrates a method 500, according to an embodiment for identifying packet processing actions to be performed at a virtual switch. The method 500 is described by way of example and not limitation as being performed by the virtual switch 102 shown in FIGS. 1 and 2. Also, some of the blocks in the method 500 may be performed in different orders. For example, block 504 may be performed before block 503 or substantially at the same time.

At block 501, the virtual switch 102 receives a packet. The packet may be from an external device, such as the network switch 120.

At block 502, the packet detection 202 determines whether the packet is a learning packet that identifies a packet processing action that may be performed at the virtual switch 102. The action is an action associated with forwarding packets. The action is an action that can be performed at the virtual switch 102 instead of the network device 120. In one embodiment, the action is a single action comprised of the "accept" action for a matching packet signature and no other action is to be performed for the packet. In this embodiment, the learning packet may include a regular packet with a bit set to indicate that the packet signature for the packet is to be stored in the packet signature cache.

At block 503, if the received packet is a learning packet, the packet detection 202 stores the packet signature in the packet signature cache 205.

At block 504, if the received packet is not a learning packet, the cache invalidation module 204 determines if the received packet is a cache invalidation packet that indicates an action associated with a packet signature stored in the packet signature cache 205 may have been modified.

If the packet is a cache invalidation packet, at block 505 the cache invalidation module 204 may delete all the actions in the cache or delete a single packet signature, for example, if the cache invalidation packet identifies a packet signature to delete.

If the received packet is not a learning packet nor a cache invalidation packet, the traffic forwarding module 201 forwards the packet at block 506.

Figure 6:
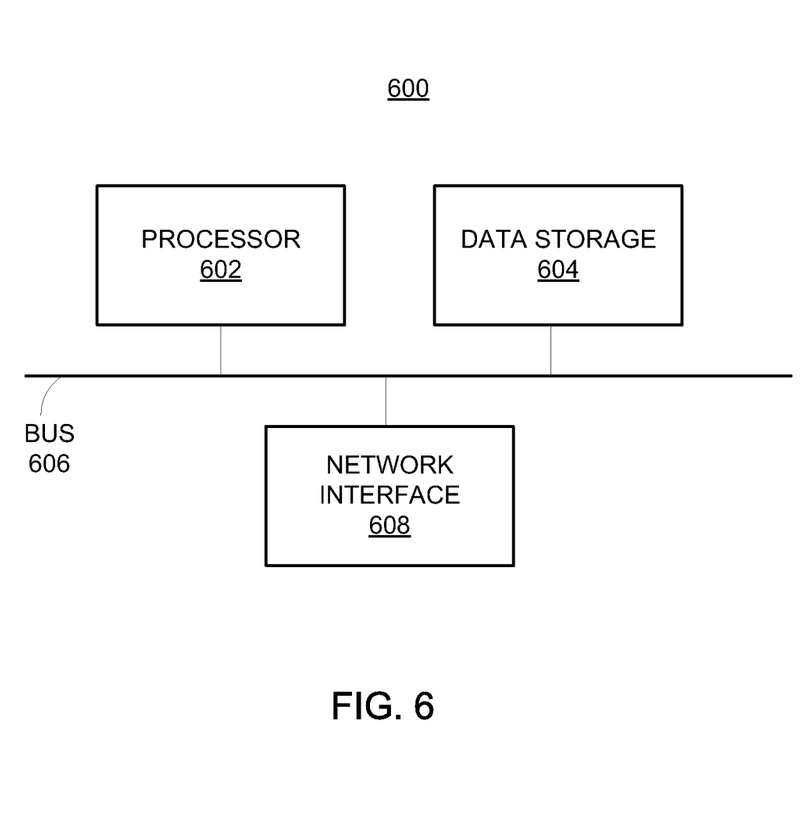
FIG. 6 illustrates a computer system that may be used for the methods and system, according to an embodiment.

FIG. 6 shows a computer system 600 that may be used with the embodiments described herein. The computer system 600 represents a generic platform that includes components that may be in a server or another computer system or in components of a computer system. The computer system 600 may be used as a platform for one or more of the devices in the system 100. The computer system 600 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 or other hardware processing circuit that may implement or execute machine readable instructions performing some or all of the methods, functions and other processes described herein. Commands and data from the processor 602 are communicated over a communication bus 606. The computer system 600 also includes data storage 604, such as random access memory (RAM) or another type of data storage, where the machine readable instructions and data for the processor 602 may reside during runtime. Network interface 608 sends and receives data from a network. The computer system 600 may include other components not shown.

While the embodiments have been described with reference to examples, various modifications to the described embodiments may be made without departing from the scope of the claimed embodiments.

What is claimed is:
1. A method of processing packets, the method comprising:
 receiving, at a virtual switch, a packet from an external switch, the virtual switch being hosted by a computer system hosting the virtual switch and a plurality of virtual machines;

determining, by the virtual switch, whether the received packet includes a bit set to indicate that the received packet is a learning packet to instruct the virtual switch to perform a single routing action and no other routing action in response to another received packet having a packet signature identical to the packet signature determined from the learning packet, wherein the bit is set by the external switch in response to a determination by the external switch that the packet is approved to be forwarded by the virtual switch to a destination and no other routing action is to be applied to the packet;

in response to a determination that the received packet is a learning packet, the virtual switch storing, in a packet signature cache of the virtual switch, the determined packet signature of the learning packet;

receiving, at the virtual switch a packet from a virtual machine of the plurality of virtual machines, and determining the packet signature of the packet received from the virtual machine;

determining whether the packet signature of the packet received from the virtual machine matches a stored packet signature in the packet signature cache;

in response to a determination that the packet signature of the packet received from the virtual machine matches a stored packet signature, performing the single routing action, wherein the single routing action is forwarding the packet received from the virtual machine directly to a destination virtual machine of the plurality of virtual machines; and in response to determining that the packet signature of the packet received from the virtual machine does not match a stored packet signature, forwarding the packet received from the virtual machine to the external switch.

2. The method of claim 1, further comprising:

receiving a second packet from the external switch;

determining if the second packet is a cache invalidation packet; and if the second packet is a cache invalidation packet, deleting a packet signature from the packet signature cache.

3. The method of claim 2, wherein deleting a packet signature from the packet signature cache comprises:

deleting all packet signatures from the packet signature cache.

4. The method of claim 1, wherein the destination of the packet received from the virtual machine comprises a second virtual machine of the plurality of virtual machines.

5. A virtual switch to forward packets for a plurality of virtual machines hosted by a computer system, the virtual switch comprising:

a packet detection module executed by computer hardware to determine whether a packet received from an external switch includes a bit set to indicate that the packet is a learning packet to instruct the virtual switch to perform a single routing action and no other routing action in response to another received packet having a packet signature identical to the packet signature determined from the learning packet, wherein the bit is set by the external switch in response to a determination by the external switch that the packet is approved to be forwarded by the virtual switch to a destination and no other routing action is to be applied to the packet;

a packet signature cache to store the determined packet signature;

wherein the virtual switch receives a packet from a virtual machine of the plurality of virtual machines, the virtual switch further comprising:

a cache lookup module to determine whether a packet signature of the packet received from the virtual machine matches the packet signature stored in the packet signature cache;

a traffic forwarding module to perform the single routing action, wherein the single routing action is forwarding the packet received from the virtual machine directly to a destination virtual machine of the plurality of virtual machines in response to a determination that the packet signature of the packet received from the virtual machine matches a stored packet signature, and in response to a determination that no match is found, the traffic forwarding module is to forward the packet received from the virtual machine to the external switch.

6. The virtual switch of claim 5 comprising:

a cache invalidation module to determine if a packet received at the virtual switch is a cache invalidation packet, and in response to a determination that the packet is a cache invalidation packet, to delete a packet signature from the packet signature cache.

7. The virtual switch of claim 6, wherein all packet signatures are deleted from the packet signature cache in response to a determination that the packet is a cache invalidation packet.

8. The virtual switch of claim 6, wherein the packet signature deleted from the packet signature is identified from the cache invalidation packet.

9. The virtual switch of claim 5, wherein the virtual switch is provided in a virtualization layer on the computer system.

10. The virtual switch of claim 5, wherein the virtual switch is provided in a network interface card in the computer system.

11. A network switch connectable to a computer system hosting a plurality of virtual machines, the network switch comprising:

a rule table storing prioritized rules for processing received packets, each rule comprising a signature based upon a defined set of packet fields, and at least one corresponding packet processing action for each signature, wherein, for each received packet, the packet processing action corresponding to a highest priority rule that matches the packet signature of the received packet is selected; and a packet marking module, executed by hardware to determine whether the selected packet processing action corresponding to the packet signature of the selected packet processing action for the rule having the highest priority is a single routing action to be performed by a virtual switch in the computer system, and no other routing action is to be applied to the packet by the virtual switch, and in response to a determination that the packet processing action is the single routing action to be performed by the virtual switch and no other routing action is to be applied to the packet by the virtual switch, the network switch is to send a learning packet to the virtual switch to instruct the virtual switch to store the packet signature in a packet signature cache of the virtual switch, and to perform the single routing action and no other routing action on another received packet having the cached packet signature, wherein the single routing action is forwarding the another received packet directly to a destination virtual machine of the plurality of virtual machines.

12. The network switch of claim 11 comprising:

a cache invalidation module to send a cache invalidation packet to the virtual switch responsive to a modification of an action in the rule table, wherein the virtual switch deletes packet signatures stored in a packet signature cache at the virtual switch responsive to receiving the cache invalidation packet, and the cache invalidation module to determine whether an invalidation acknowledgement packet from the virtual switch is received within a predetermined period of time, wherein if the invalidation acknowledgement packet is received within the predetermined period of time, the cache invalidation module is to change to the rule table is complete, and if the invalidation acknowledgement packet is not received within the predetermined period of time, the cache invalidation module is to re-send the cache invalidation packet to the virtual switch.

13. The method of claim 1, wherein the learning packet is a packet indicating that the virtual switch is to forward future packets with a same signature as the learning packet without participation of the external switch.

\* \* \* \* \*